US006174032B1

United States Patent
Conaway

(10) Patent No.: US 6,174,032 B1
(45) Date of Patent: Jan. 16, 2001

(54) SHOULDER STRAP REPOSITIONER FOR VEHICLE SEAT BELT ASSEMBLY

(76) Inventor: Brian J. Conaway, 1827 King Ave., Columbus, OH (US) 43212

( * ) Notice: Under 35 U.S.C. 154(b), the term of this patent shall be extended for 0 days.

(21) Appl. No.: 09/418,077

(22) Filed: Oct. 14, 1999

Related U.S. Application Data

(63) Continuation-in-part of application No. 09/369,774, filed on Aug. 6, 1999, now abandoned.

(51) Int. Cl.⁷ .................................................. A47D 15/00
(52) U.S. Cl. .......................................... 297/487; 297/483
(58) Field of Search ................................. 280/801.1, 808, 280/748, 751; 297/464, 482, 483, 487, 488, DIG. 2, 485, 468, 469, 470

(56) References Cited

U.S. PATENT DOCUMENTS

| | | |
|---|---|---|
| D. 349,589 | 8/1994 | York ..................... D29/100 |
| D. 408,961 | 5/1999 | Myers ................... D2/639 |
| 3,713,693 | 1/1973 | Cadiou . |
| 3,941,404 | 3/1976 | Otaegui-Ugarte ............ D29/100 |
| 3,968,994 | 7/1976 | Chika . |
| 4,236,755 | 12/1980 | Pollitt et al. . |
| 4,289,352 | 9/1981 | Ashworth . |
| 4,502,732 | 3/1985 | Williams ............. 297/483 |
| 4,609,205 | 9/1986 | McKeever . |
| 4,786,078 | 11/1988 | Schreier et al. . |
| 4,796,919 | 1/1989 | Linden . |
| 4,886,318 | 12/1989 | Pennock . |
| 4,951,965 | 8/1990 | Brown . |
| 5,154,446 | 10/1992 | Blake . |
| 5,178,439 | 1/1993 | McCracken . |
| 5,201,099 | 4/1993 | Campbell . |
| 5,213,366 | 5/1993 | Sweger, Jr. . |
| 5,248,187 | 9/1993 | Harrison .............. 297/488 |
| 5,255,940 | 10/1993 | Kornblum et al. . |
| 5,265,910 | 11/1993 | Barr et al. . |
| 5,275,468 | 1/1994 | Vacanti . |
| 5,335,957 | 8/1994 | Golder . |
| 5,421,614 | 6/1995 | Zheng . |
| 5,468,020 | 11/1995 | Scime . |
| 5,605,380 | 2/1997 | Gerstenberger et al. ........... 297/483 |
| 5,692,246 | 12/1997 | Benedick ................. 2/463 |

OTHER PUBLICATIONS

Millennium Products "Child Protector," P.O. Box 117, Oshtemo MI 49077–0117. Photograph and description downloaded from internet http://2001safe.com/protector.htm Aug. 5, 1999. Actual effective date unknown.

*Primary Examiner*—Milton Nelson, Jr.
(74) *Attorney, Agent, or Firm*—Carter & Schnedler, P.A.

(57) ABSTRACT

A shoulder strap repositioner, which may also be referred to as an "adjuster," for repositioning or deflecting away from the face of a child the diagonally-extending shoulder strap component of a vehicle seat belt assembly of the type having a lap belt and a diagonally-extending shoulder strap. In an exemplary embodiment, the repositioner includes a body positionable against the torso of a seated person. The body in turn includes a center section having opposed front and rear surfaces, and left and right side wings likewise having opposed front and rear surfaces. Each of the side wings is joined to the center section at the top and bottom, so that inner edges of the side wings and side edges of the center section cooperate to define a pair of laterally spaced generally vertically-extending slots in the body, the slots having closed peripheries. During use, the lap belt and shoulder strap pass through the slots. In an exemplary manner of use, the lap belt and shoulder strap cross over portions of the front surfaces of the side wings, and over portions of the rear surface of the center section. The lap belt is positioned adjacent relatively the lower terminations of the slots, and the shoulder strap contacts the relatively upper terminations of one of the slots to thereby be repositioned or deflected.

25 Claims, 14 Drawing Sheets

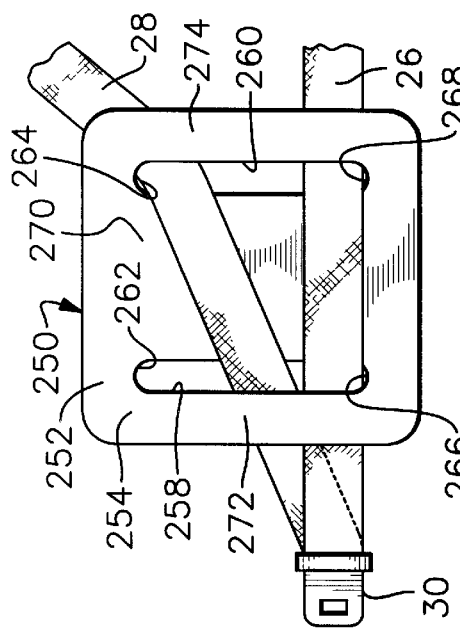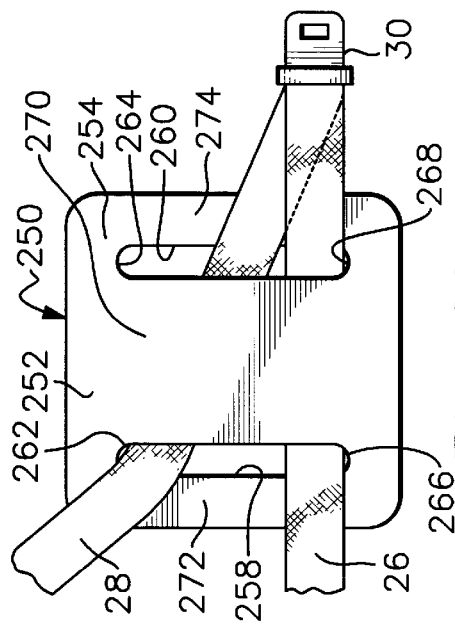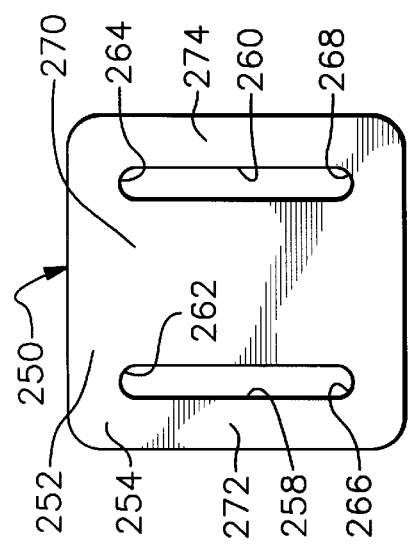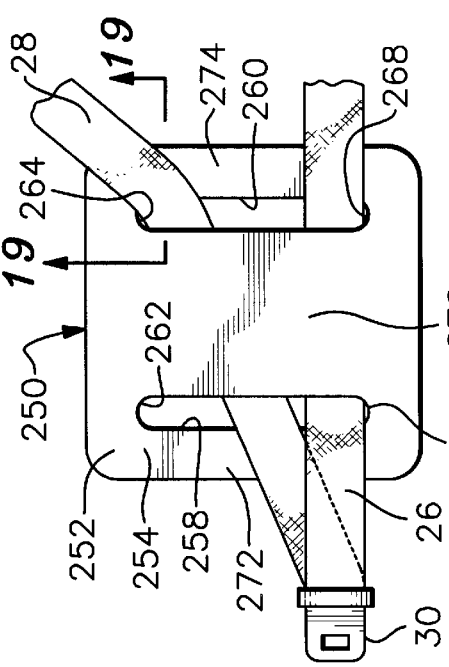

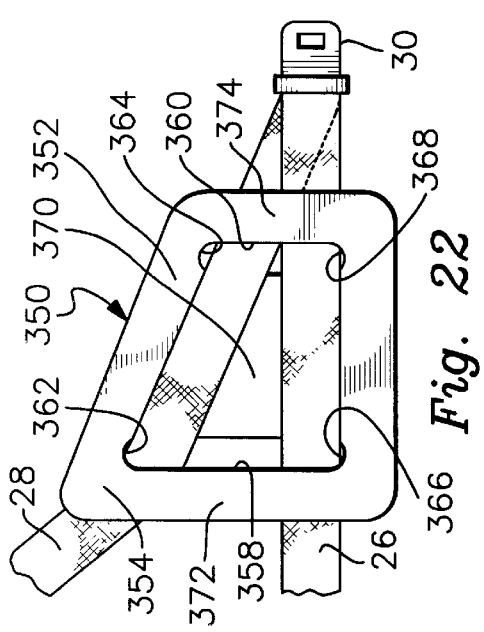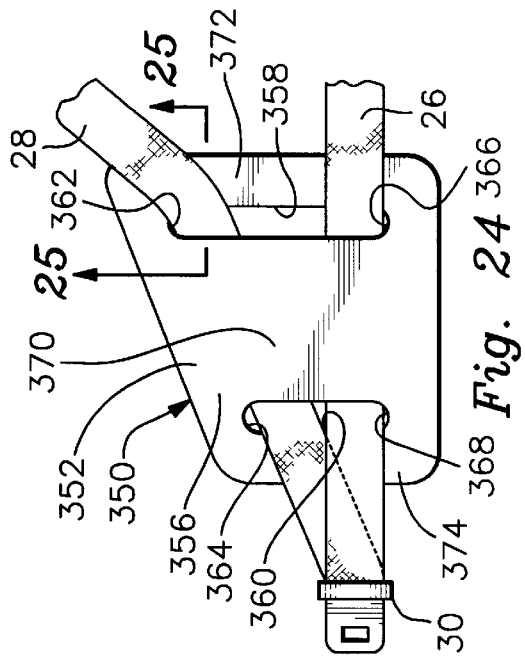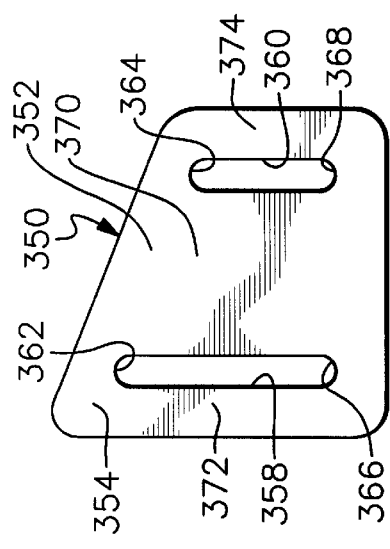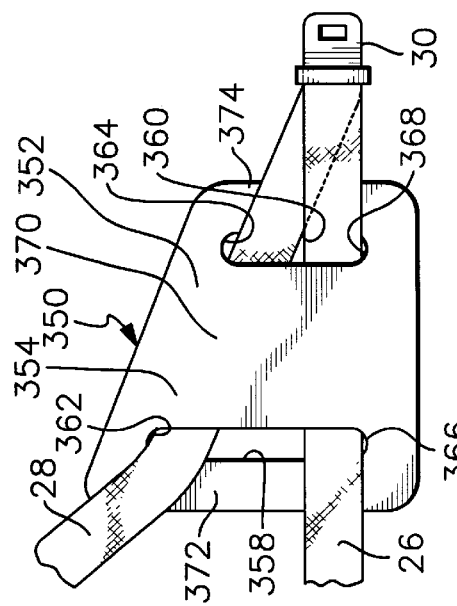

SHOULDER STRAP REPOSITIONER FOR VEHICLE SEAT BELT ASSEMBLY

CROSS-REFERENCE TO RELATED APPLICATION

This is a continuation-in-part of application Ser. No. 09/369,774, filed Aug. 6, 1999, and now abandoned.

BACKGROUND OF THE INVENTION

The invention relates generally to vehicle seat belt assemblies of the type having a lap belt and a diagonally-extending shoulder strap. The invention more particularly relates to shoulder strap repositioners, which may also be referred to as "adjusters," for repositioning or deflecting the diagonally-extending shoulder strap component of the vehicle seat belt assembly.

Conventional vehicle seat belt assemblies, which include a lap belt and a diagonally-extending shoulder strap, are designed primarily for use by adults of average size. When used by an adult, the shoulder strap extends generally across the chest and shoulder of the individual.

However, when the seat belt assembly is used by a child or a smaller adult, the shoulder strap typically extends across the neck or face of the child because his or her upper body is not quite as long as that of a taller individual.

A variety of shoulder strap repositioners or "adjusters," particularly for use by children, have been proposed, and several have been commercially produced. Examples are disclosed in McCracken U.S. Pat. No. 5,178,439; Kornblum et al U.S. Pat. No. 5,255,940; Barr et al U.S. Pat. No. 5,265,910; Vicanti U.S. Pat. No. 5,275,468; Golder U.S. Pat. No. 5,335,957 and Zheng U.S. Pat. No. 5,421,614.

While many of these repositioners or "adjusters" are apparently effective for their intended purpose, there nevertheless remains room for improvement in areas such as ease of use, comfort, and manufacturability.

SUMMARY OF THE INVENTION

In an exemplary embodiment of the invention, a shoulder strap repositioner takes the form of a body positionable against the torso of a seated person. The body has a pair of opposed surfaces and a pair of laterally spaced generally vertically-extending slots in the body. The slots have respective relatively upper and relatively lower terminations and have closed peripheries. The slots are configured such that, during use, the lap belt and shoulder strap pass through the slots. The lap belt and shoulder strap cross over portions of one of the opposed surfaces in the region between the slots, and cross over portions of the other one of the opposed surfaces and regions outside of the slots. During use, the lap belt is positioned adjacent the lower terminations of the slots, and the shoulder strap contacts the upper termination of one of the slots.

In another exemplary embodiment, a shoulder strap repositioner comprises a body including left and right side wings, each of which has a rear surface that faces the torso during use, as well as an opposed front surface. The left and right side wings have respective generally vertically-extending outer edges defining the left and right sides of the body, and have respective generally vertically-extending inner edges facing towards each other. The body additionally includes a center section likewise having a rear surface, and an opposed front surface, as well as generally vertically-extending left and right side edges. Each of the side wings is joined to the center section at the top and bottom, so that the inner edges of the side wings and the side edges of the center section cooperate to define generally vertically-extending left and right side slots having respective relatively upper and relatively lower terminations and having closed peripheries. The slots are configured such that, during use, the lap belt and shoulder strap pass through the slots with the lap belt and shoulder strap crossing over portions of the front surfaces of the side wings, and crossing over portions of the rear surface of the center section, with the lap belt positioned adjacent the lower ends of the slots, and with the shoulder strap contacting the upper end of one of the slots.

BRIEF DESCRIPTION OF THE DRAWINGS

While the novel features of the invention are set forth with particularly in the appended claims, the invention, both as to organization and content, will be better understood and appreciated, from the following detailed description taken in conjunction with the drawings, in which:

FIG. 16 depicts an alternative shoulder strap repositioner embodying the invention;

FIG. 17 depicts one manner of use of the FIG. 16 repositioner;

FIG. 18 depicts another manner of use of the FIG. 16 repositioner;

FIG. 20 depicts yet another manner of use of the FIG. 16 repositioner;

FIG. 21 depicts another alternative shoulder strap repositioner embodying the invention;

FIG. 22 depicts one manner of use of the FIG. 21 repositioner;

FIG. 23 depicts another manner of use of the FIG. 21 repositioner;

FIG. 24 depicts yet another manner of use of the FIG. 21 repositioner; and

DETAILED DESCRIPTION

Figure 1:
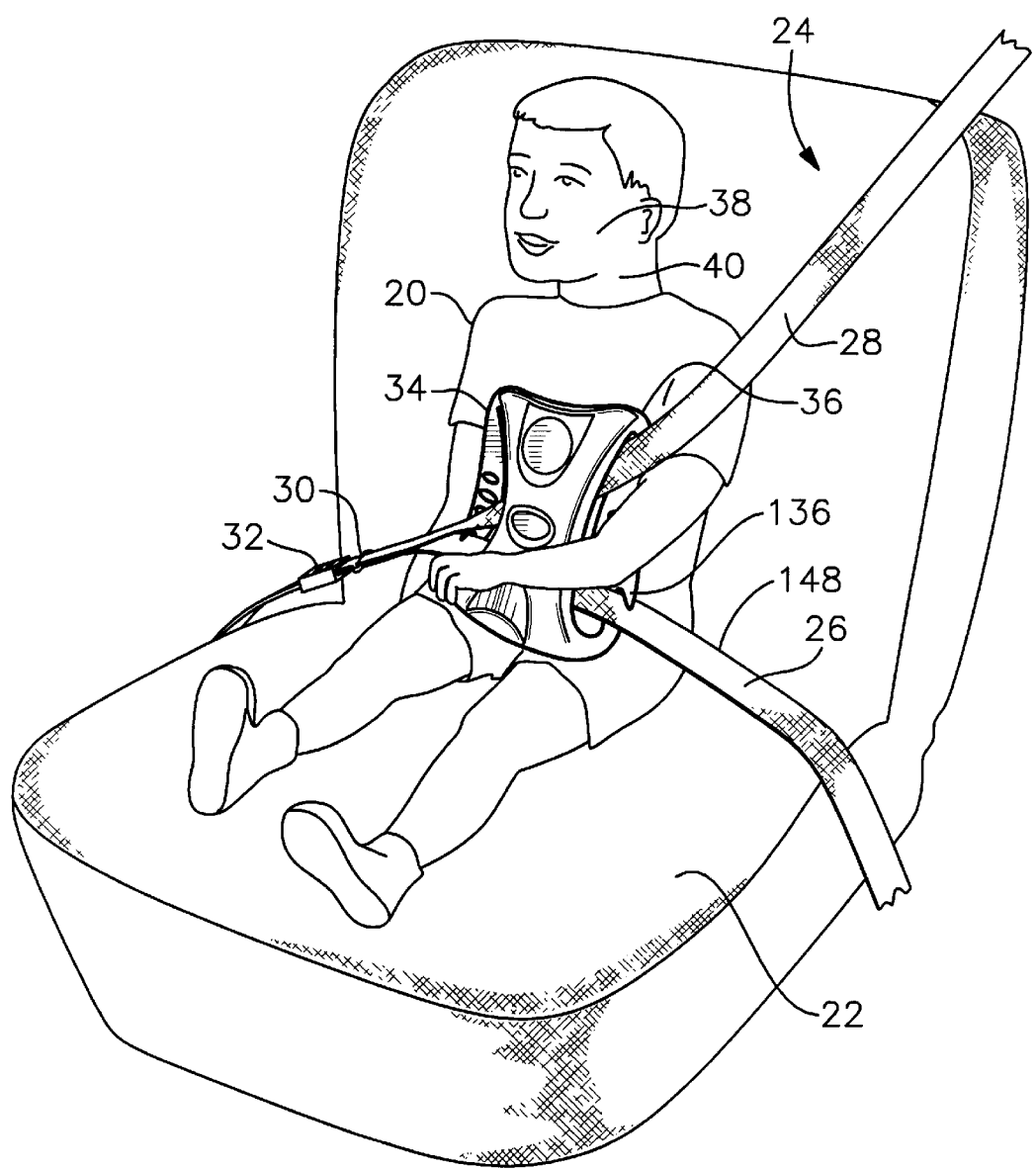
FIG. 1 depicts a shoulder strap repositioner embodying the invention in use.

Referring first to FIG. 1, a child 20 or an adult of short stature is seated in a vehicle seat 22 equipped with a conventional vehicle seat belt assembly, generally designated 24, including a lap belt 26 and a diagonally-extending shoulder strap 28 attached to one element 30 of a buckle device 32. A shoulder strap repositioner 34 embodying the invention is positioned against the torso 36 of the child 20, or other seated person. In the absence of deflection provided by the repositioner 34, the shoulder strap 28 undesirably would tend to cross over the face 38 or neck 40 of the child 20.

Referring now additionally to FIGS. 2–6 and 10, the repositioner 34 comprises a body 50 having a top 52, a bottom 54, a left side 56 and a right side 58. In an exemplary embodiment, the body 50 is a one piece injection molded part of relatively soft plastic material, such as ENGAGE 8403, a polyolefin elastomer ethylene alpha-olefin copolymer, available from DuPont Dow Elastomers. This material advantageously has a relatively high tensile elongation, in excess of 600%. In addition, the material has a relatively high tensile yield, approximately 1200 psi. Thus, although the body 50 is relatively soft and pliable for comfort, under crash conditions it performs well, stretching without breaking. Another characteristic of the material is a relatively high heat distortion temperature of 1900° F., such that the body 50 retains its shape even when left in a hot vehicle in the sun.

In the exemplary embodiment, the repositioner 34 is laterally symmetrical about a vertical center plane so that it can comfortably be used with seat belt assemblies on either side of the vehicle while maintaining an attractive appearance, with the shoulder strap 28 crossing in either diagonal direction.

The body 50 includes left and right side wings 60 and 62 which have respective rear surfaces 64 and 66, that face the torso during use, and which have respective opposed front surfaces 68 and 70. The left and right side wings 60 and 62 additionally have respective generally vertically-extending outer edges 72 and 74 that define the left and right sides 56 and 58 of the body 50, and have respective generally vertically-extending inner edges 76 and 78 facing towards each other. For comfort and safety, as well as to enhance manufacturability as described hereinbelow, the exposed edges 72, 74, 76 and 78 are curved (for example, rounded) in cross-section. Also included on the side wings 60 and 62 are a series of oval apertures 80 for decorative or ornamental purposes.

The body 50 additionally includes a center section 90 having a rear surface 92, an opposed front surface 94, and generally vertically-extending left and right side edges 96 and 98. The exposed edges 96 and 98, as well as exposed edges at the top 52 and bottom 54, are curved in cross-section for safety and manufacturability. In the repositioner 34 embodiment, the center section 90 is convex in configuration when viewed from the front. The center section 90 also includes a series of ornamental or decorative features 100.

The side wings 60 and 62 are joined to the center section 90 at the top 52 and bottom 54, more particularly, in regions 102, 104, 106 and 108. When the body 50 takes the form of an injection molded plastic part, the left and right side wings 60 and 62 and the center section 90 are integral with each other. The inner edges 76 and 78 of the side wings 60 and 62, and the side edges 96 and 98 of the center section 90 thus cooperate to define generally vertically-extending left and right side slots 110 and 112 having respective upper ends 114 and 116 and respective relatively lower terminations 118 and 120. The slots 110 and 112 have closed peripheries.

The slots 110 and 112 are configured such that, during use, the lap belt 26 and shoulder strap 28 pass through the slots 110 and 112, with the lap belt 26 and shoulder strap 28 crossing over portions of the front surfaces 68 and 70 of the side wings 60 and 62, and crossing over portions of the rear surface 92 of the center section 90, that is, behind the center section 90. In the repositioner 34 embodiment, the lap belt 26 and shoulder strap 28 actually contact the crossed-over portions of the front surfaces 68 and 70, but are spaced from most of the crossed-over portions of the rear surface 92 of the center section 90, since the center section 90 is convex when viewed from the front. The lap belt 26 is positioned adjacent the relatively lower terminations 118 and 120 of the slots 110 and 112, and the shoulder strap 28 contacts the relatively upper termination 114 or 116 of one of the slots 110 or 112.

Figure 2:
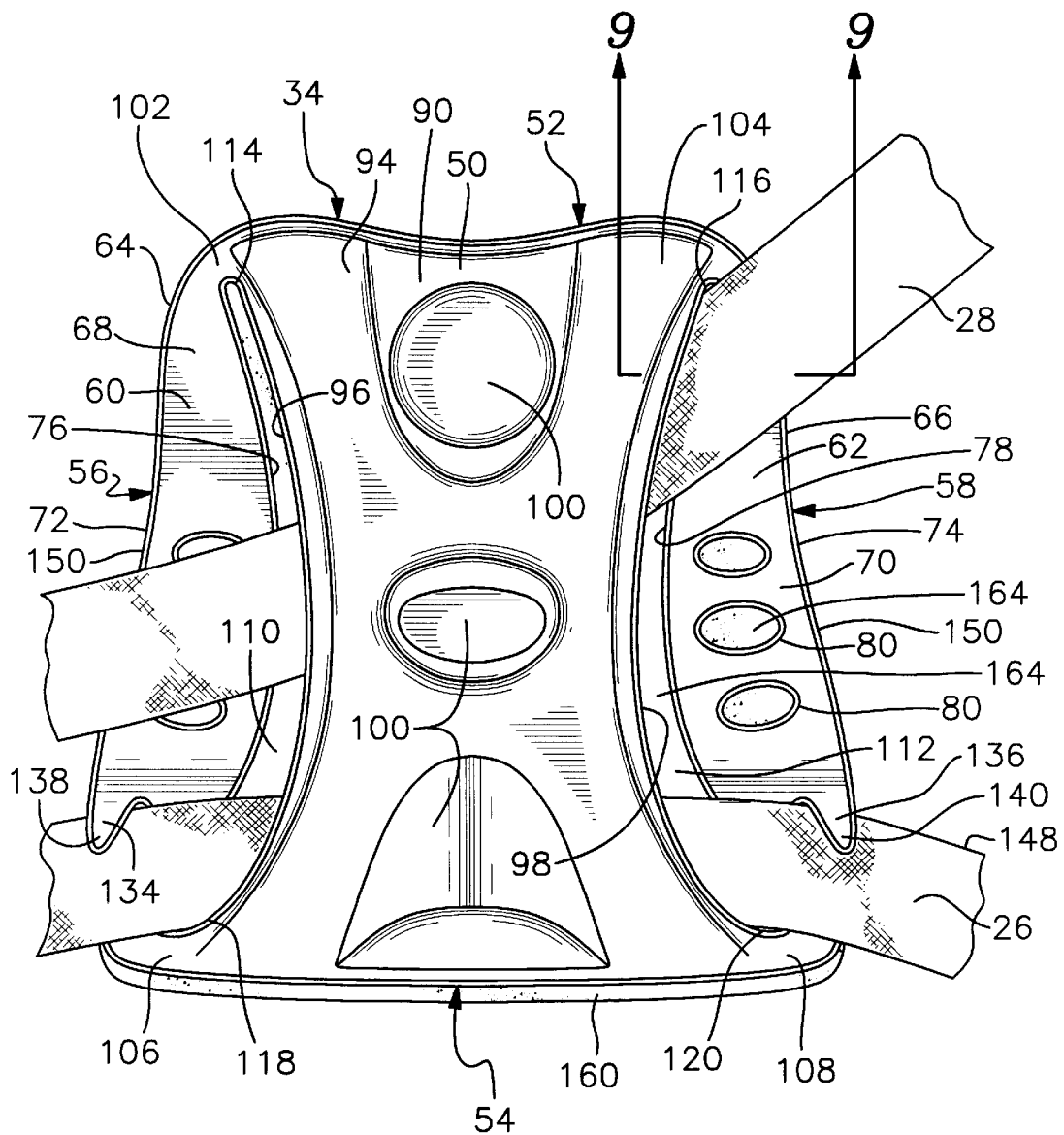
FIG. 2 is an enlarged front elevational view of the repositioner of FIG. 1, depicting the manner of engagement with the lap belt and shoulder strap.
Figure 3:
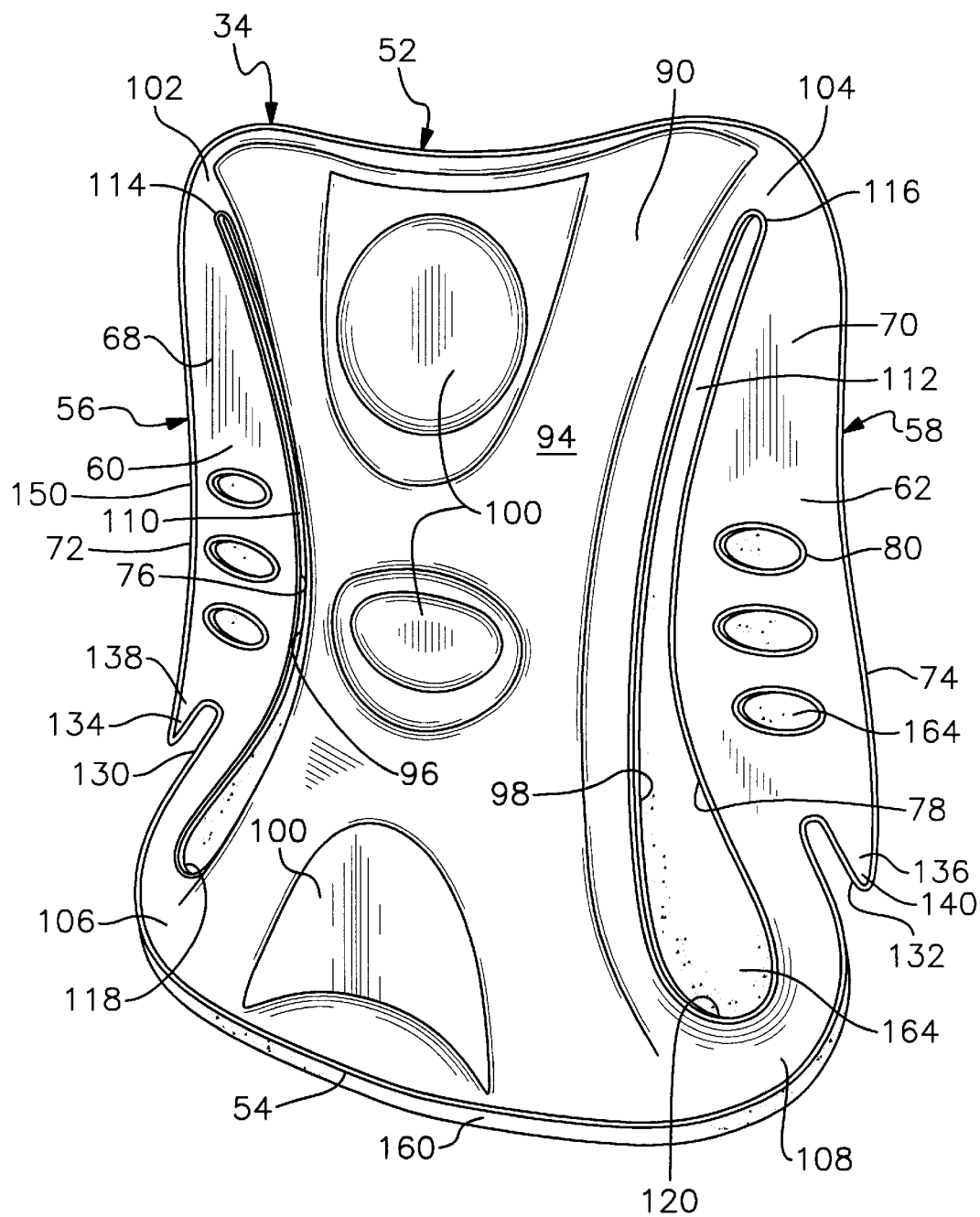
FIG. 3 is a three dimensional view of the repositioner of FIG. 1.
Figure 4:
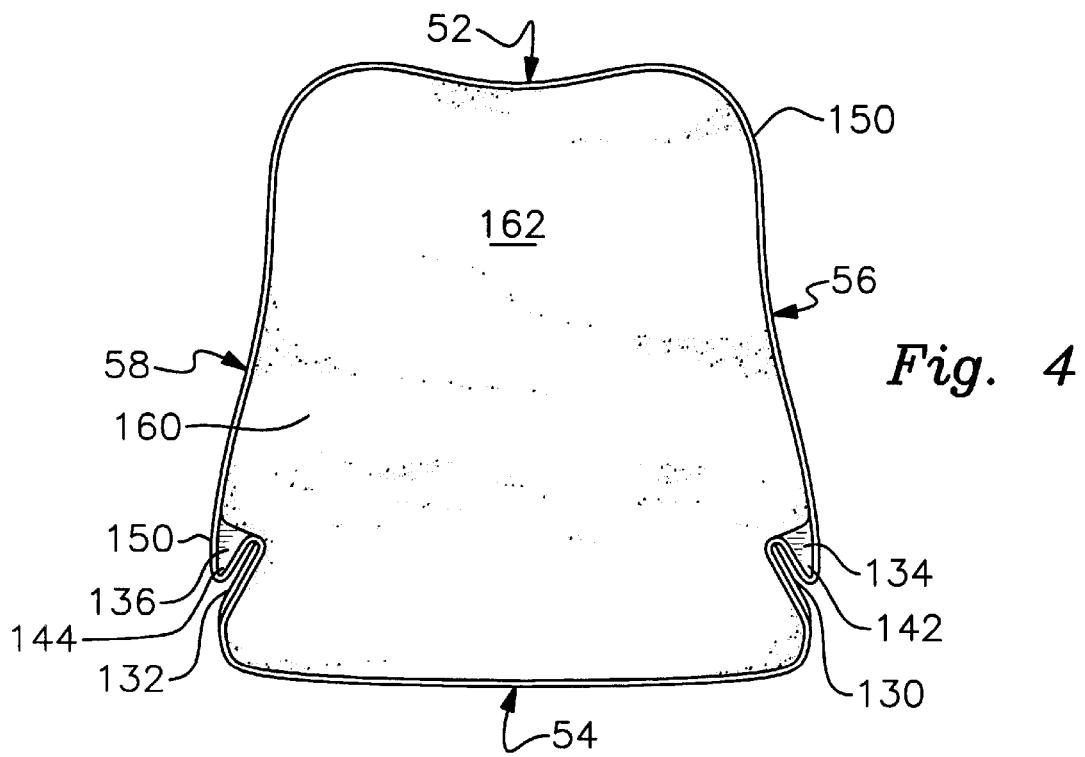
FIG. 4 is a rear view.
Figure 6:
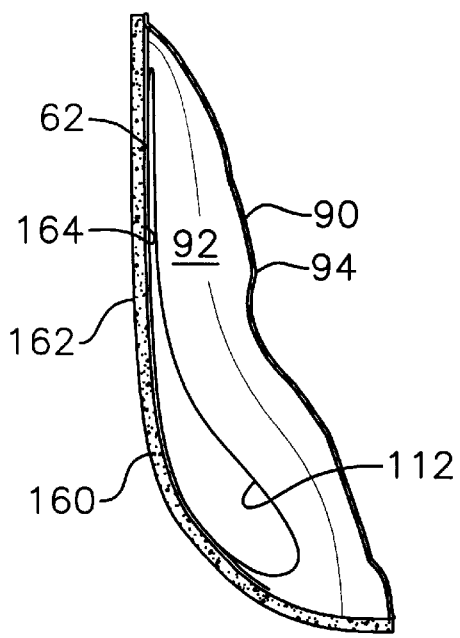
FIG. 6 is a cross-section taken on line 6—6 of FIG. 5.
Figure 7:
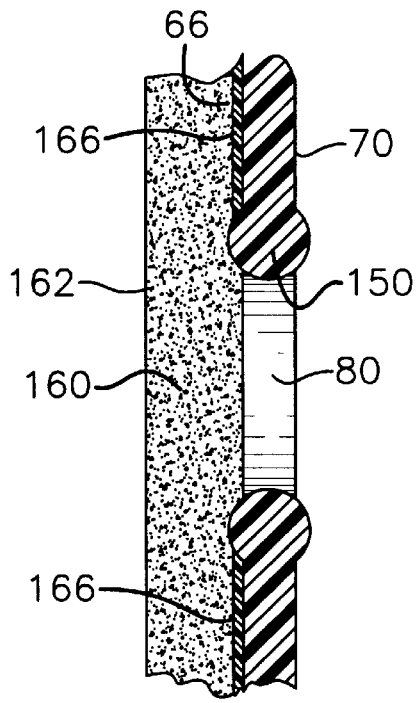
FIG. 7 is an enlarged cross-section taken on line 7—7 of FIG. 5.
Figure 5:
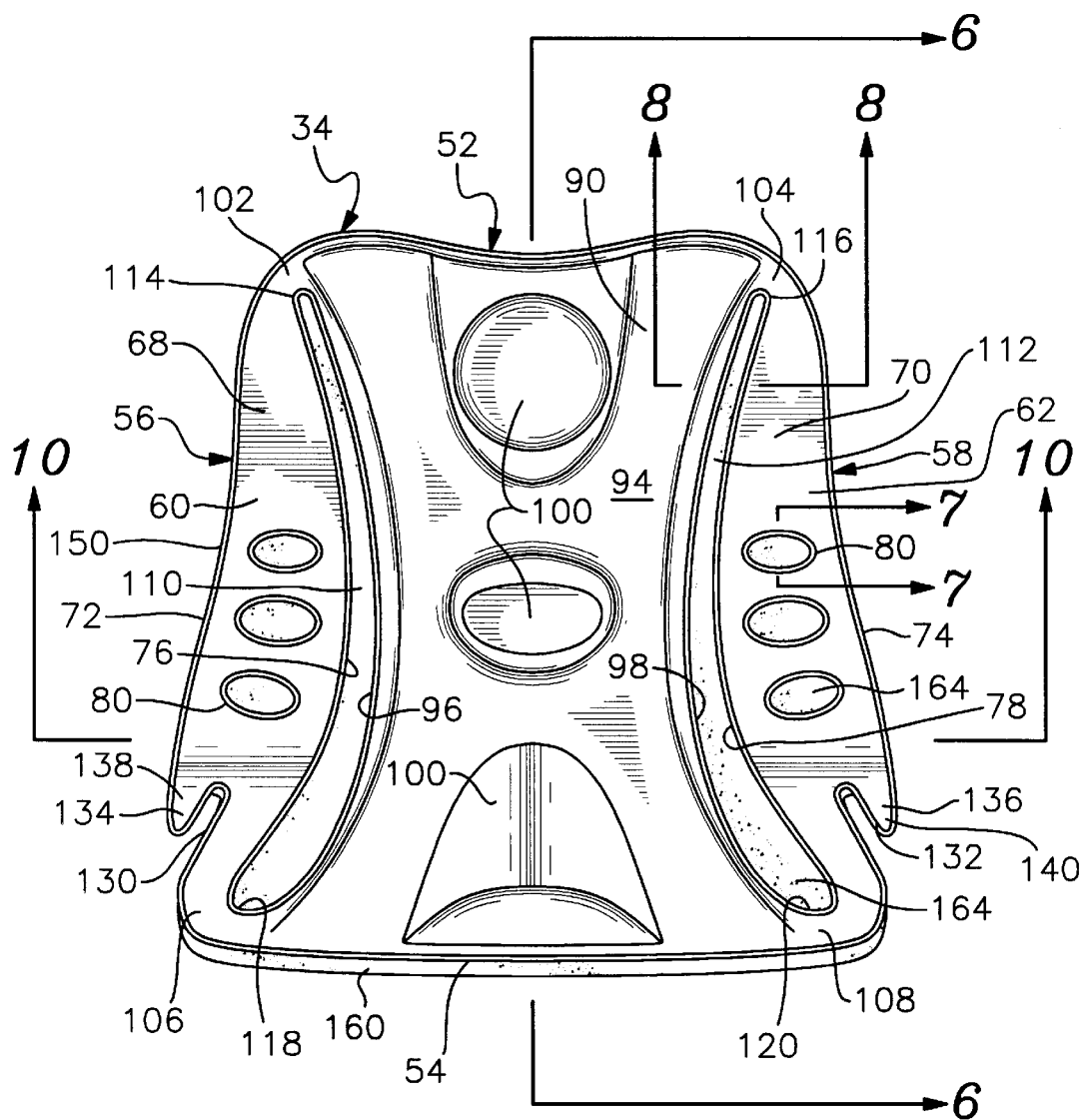
FIG. 5 is a front elevational view, similar to that of FIG. 2, but without the lap belt and shoulder strap attached.

In the particular manner of use depicted in FIGS. 1 and 2, the shoulder strap 28, when viewed from the front, diagonally extends generally from the upper right to the lower left. During initial fitting of the repositioner 34, the buckle device element 30, with lap belt 26 and shoulder strap 28 attached, is passed first through the right side slot 112, behind the center section 90, and then through the left side slot 110. The shoulder strap 28 accordingly contacts the relatively upper termination 116 of right side slot 112. With the body 50 held in position by the lap belt 26, this engagement with the relatively upper termination 116 of the slot 112 serves to deflect or redirect the shoulder strap 28 away from the face 38 and neck 40 of the seated child 20.

In addition, the geometry is such that the repositioner 34 cannot be disengaged from the lap belt 26 and shoulder strap 28 when the seat belt assembly 24 in use, as an additional safety feature.

The lateral symmetry of the repositioner 34 allows the repositioner 34 to be used with seat belt assemblies 24 on either the left or right side of the vehicle, with the front surface 94 of the center section 90 and its ornamental features 100 always visible. In addition, the rear side of the repositioner 34 is configured for comfort against the torso 36 of the user, and so is in the same orientation with reference to the torso 36 regardless of the vehicle side. Thus, FIGS. 1 and 2 may in effect be reversed in the manner of a mirror image such that the shoulder strap 28 would diagonally extend generally from the upper left to lower right. Correspondingly, during initial fitting of the repositioner 34, the buckle device element 30, with lap belt 26 and shoulder strap 28 attached, would be passed first through the left side slot 110, behind the center section 90, and then through the right side slot 112. The shoulder strap 28 would contact the relatively upper termination 114 of the left side slot 110, and thereby be deflected.

In the repositioner 34 embodiment, the slots 110 and 112 are wider near the relatively lower terminations 118 and 120 compared to near the relatively upper terminations 114 and 116, which facilitates passage of the buckle element 30 with the lap belt 26 and shoulder strap 28 attached through the slots 110 and 112, in combination with the flexibility of the material itself. Ideally, the fit is such that, when the buckle device 32 is unbuckled, and the seat belt assembly 24 is not in use, the buckle element 32 does not pass back through the slots 112 and 110, and the repositioner 34 remains attached to the lap belt 26.

As an aid to maintain the repositioner 34 in proper position during use, so that it does not slide down too low, as well as to promote correct positioning of the lap belt 26 across the pelvis, the side wings 60 and 62 have respective notches 130 and 132 formed in the outer edges 92 and 94, defining respective downwardly-projecting tabs 134 and 136 between the notches 130 and 132 and portions of the adjacent outer edges 72 and 74. The tabs 134 and 136 have respective front surfaces 138 and 140, and respective rear surfaces 142 and 144. The notches 130 and 132 are configured to engage the upper edge 148 of the lap belt 26 so as to limit downward movement of the repositioner 34 body 50 relative to the lap belt 26. When so engaged, portions of the lap belt 26 cross over the rear surfaces 142 and 144 of the tabs 134 and 136, although not necessarily in actual contact with the tabs 134 and 136, due to the generally downward direction of the lap belt 26 beginning at the notches 130 and 132.

The overall configuration of the repositioner 34, including a flaring out near the bottom 54, promotes positioning of the repositioner 34 such that the bottom 54 of the repositioner 34 is either touching or is near the legs. In conjunction with this overall configuration, engagement with the notches 130 and 132 promotes correct positioning of the lap belt 26 across the pelvis. The lower edge of a correctly positioned lap belt 26 should touch the legs, and the lap belt 26 should not ride up over the abdomen. In other words, the lap belt 26 properly should rest against the pelvis, not the abdomen. Moveover, the repositioner 34 does not force the webbing of the lap belt 26 and the shoulder strap 28 to be coplanar.

The plastic material of the body 50 and accordingly the tabs 134 and 136 are sufficiently flexible such that the tabs 134 and 136 can deflect for engagement of the notches 130 and 132 and the lap belt 26. In some cases, when a child is buckled up, a person will notice the notches 130 and 132, and deliberately engage the lap belt 26. However, even if the notches 130 and 132 and the lap belt 26 are not deliberately engaged, the tabs 134 and 136 tend to deflect rearwardly (as well as downwardly) as the lap belt 26 is tightened, and then automatically pop back into position to engage the upper edge 148 of the lap belt 26. Automatic engagement thus results.

Another characteristic of the notches 130 and 132 and tabs 134 and 136 is that they tend to remain engaged with the lap belt 26 even when the repositioner 34 is not in use. In combination with the manner which the shoulder strap 28 is gripped near the upper end 116 of the slot 112 (or the upper end 114 of the slot 110 in the reverse configuration) as described hereinbelow, in particular with reference to FIGS. 8 and 9, the repositioner 34 tends to be in approximately the correct position when the user next buckles up.

As noted hereinabove, the various exposed edges of the side wings 58 and 60, as well as of the center section 90, are curved (for example, rounded) in cross-section, for comfort and safety, as well as out of manufacturing considerations. In the exemplary embodiment, there are rounded beads 150 on all exposed edges, and the rounded beads 150 extend beyond the front surfaces 68, 70 and 94 and beyond the rear surfaces 64, 66 and 92.

In addition to the body 50, the repositioner 34 comprises a backing sheet 160, such as a layer of elastomeric foam 160, which extends across the rear surfaces 64 and 66 of the side wings 60 and 62, and behind the center section 90 of the body 50. However, as may be seen in FIG. 4, to avoid interference when the lap belt 26 engages the notches 130 and 132, there is no foam backing 160 on the rear surfaces 142 and 144 of the tabs 134 and 136.

The foam backing 160 has a rear surface 162 and an opposed front surface 164, and is adhered to the injection-molded plastic body 50 at least to a perimeter glue surface around the entire periphery of the body 50 (except for the rear surfaces 142 and 144 of the tabs 134 and 136), including at the top 52, bottom 54, as well as the left and right sides 56 and 58, preferably just inside the rounded bead 150. Thus, during assembly, the rounded bead 150 projecting past the rear surfaces 64, 66 and 92 serves as a convenient reference point for application of adhesive, and a barrier against undesired migration of adhesive during assembly.

In a typical assembly process, adhesive is applied to the rear surface 92 of the center section 90 at the top 52 and bottom 54, just inside the bead 150; and adhesive is applied to the rear surfaces 64 and 66 of the left and right side wings 60 and 62 along the outer edges 72 and 74, along the inner edges 76 and 78, and around the oval apertures 80, again just inside the bead 150. Optionally, adhesive is applied to the rear surfaces 64 and 66 of the left and right side wings 60 and 62 in their entireties. The foam backing sheet 160 however is not generally adhered to the center section 90 of the body, at least between the left and right side edges 96 and 98 at the edges of the slots 110 and 112. A layer of adhesive 166 is visible in FIGS. 7, 8, 9 and 10.

Thus, during use, the lap belt 26 and shoulder strap 28 pass between the front surface 164 of the foam backing sheet 160, and the rear surface 92 of the center section 90 of the body 50. Since the center section 90 is convex in configuration when viewed from the front, there accordingly is defined an empty cavity 168, best seen in the cross-sectional views of FIGS. 6 and 10, and consequently during use there may be a substantial spacing between the rear surface 92 of the center section 90 and the lap belt 26 and shoulder strap 28.

This construction, particularly when combined with the relatively soft plastic material of the body 50 and in particular of the side wings 58 and 60, results in a high degree of comfort for the user.

A feature of the repositioner 34 embodiment is the manner in which the shoulder strap 28 is gripped near the relatively upper termination 116 of the slot 112 (or near the relatively upper termination 114 of the slot 110 in the reverse configuration). This encourages the shoulder strap 28 to stay in position relative to the repositioner 34 when not in use, so that the repositioner 34 is at least in approximately the correct position when the user next buckles up, particularly in combination with the engagement of the notches 130 and 132 with the lap belt 26 as described hereinabove.

This is accomplished in part by the slots 110 and 112 being relatively narrower near their relatively upper terminations 114 and 116, and becoming relatively wider near their relatively lower terminations 118 and 120.

Figure 8:
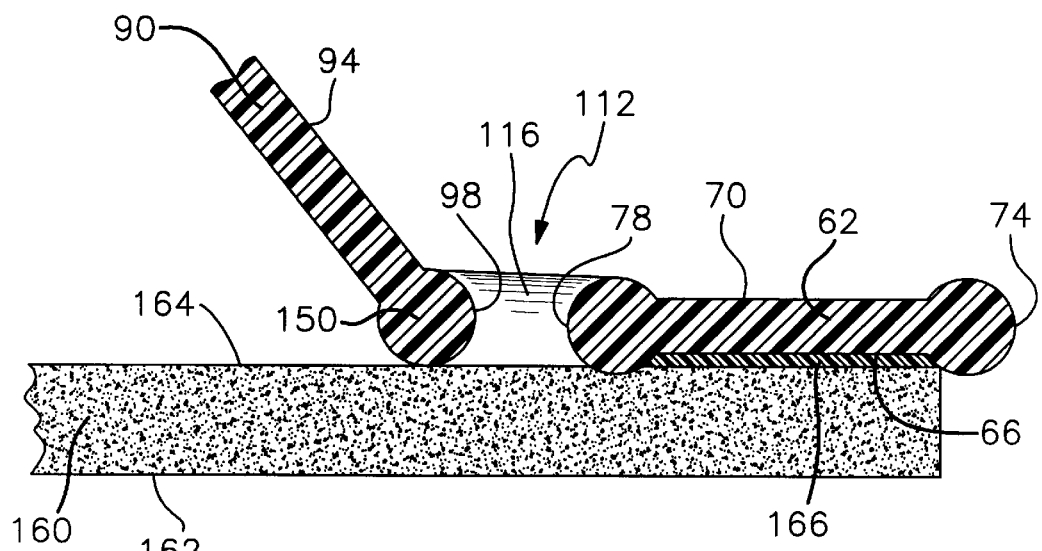
FIG. 8 is an enlarged cross-section taken on line 8—8 of FIG. 5, depicting a portion of the repositioner when a shoulder strap is not inserted through the slots.
Figure 9:
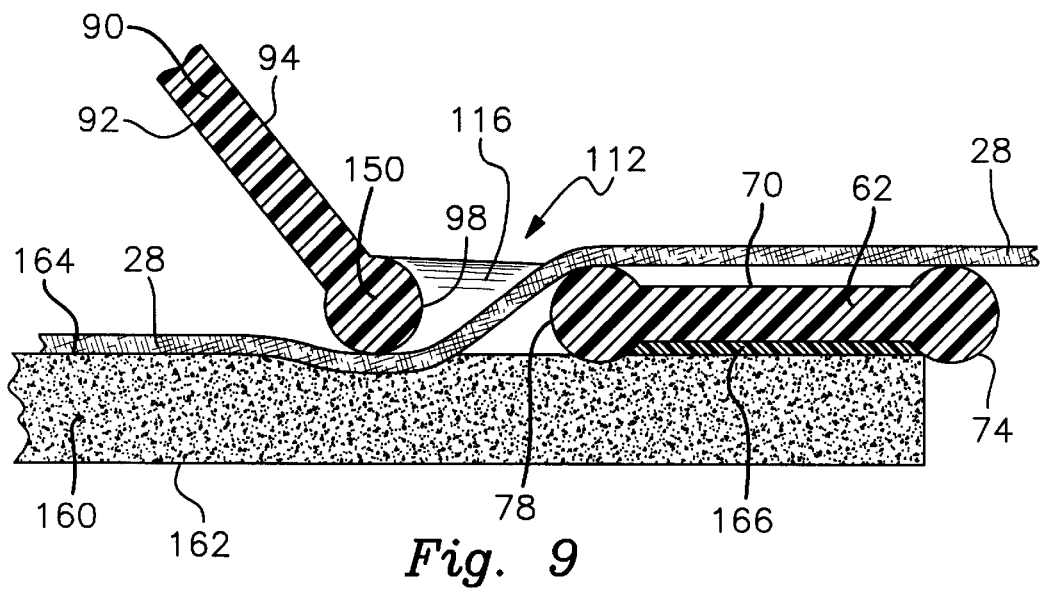
FIG. 9 is a similar cross-section taken on line 9—9 of FIG. 2, depicting the same region when a shoulder strap is threaded through a slot.

In addition, and as is depicted in FIGS. 8 and 9, which are cross-sections in the vicinity of the relatively upper termination 116 of the right side slot 112 respectively without and with the shoulder strap 28 in position, the inner edges 76 and 78 of the wings 60 and 62, the side edges 96 and 98 of the center section 90, and the foam backing sheet 160 are configured so as to frictionally grip the shoulder strap 28. (The inner edge 76 of wing 60 and the left side edge 96 of center section 90 comprise edges of the left slide slot 110. Likewise, the inner edge 78 wing 62 and the right side edge 98 of center section 90 comprise edges of the right side slot 112.) In FIG. 8, which is a cross-section taken on line 8—8 of FIG. 5 with the shoulder strap not present, there is contact between the front surface 164 of the foam backing 160 and the grounded bead 150 at the right side edge 98 of the center section 90, but no adhesive. Adhesive 166 is present between the rear surface 66 of the right side wing 62 and the front surface 164 of the foam backing 160.

In FIG. 9, which is a cross-section of the same structure, but taken on line 9—9 of FIG. 2 with the shoulder strap 28 present, the shoulder strap 28 passes between the edge 98 and the front surface 164 of the foam backing 160, for frictional engagement with the edge 98 and surface 164. As a design parameter, the degree of friction and thus the "grip" can be controlled by selecting the size and configuration of the bead 150. Depending upon the degree to which the center section 90 is convex when viewed from the front (and concave when viewed from the rear), and its profile, the bead 150 or other structure on the edge 98 can be extended rearwardly, particularly in the vicinity of the shoulder strap 28, so as to ensure frictional engagement. In FIG. 9, there is also a degree of frictional engagement between the shoulder strap 28 and the edge 78. Thus, both edges 78 and 98 comprising edges of the slot 112 contribute to frictional engagement.

In addition, the shoulder strap 28 can be encouraged to stay in position relative to the repositioner 34 when not in use, by frictional engagement with edges 76 and 96 comprising edges of the left side slot 110 at a location somewhere intermediate the relatively upper termination 114 and the relatively lower termination 120.

A feature of the repositioner 34 is its manufacturability, as the body 50 may comprise a one-piece injection molded part. The configuration facilitates design of an injection mold including a core and a cavity which employs shut off surfaces rather than knife edges for enhanced injection mold life and minimal flash caused by plastic leaking at the mold parting line, which undesirably could result in a sharp edge.

Figure 10:
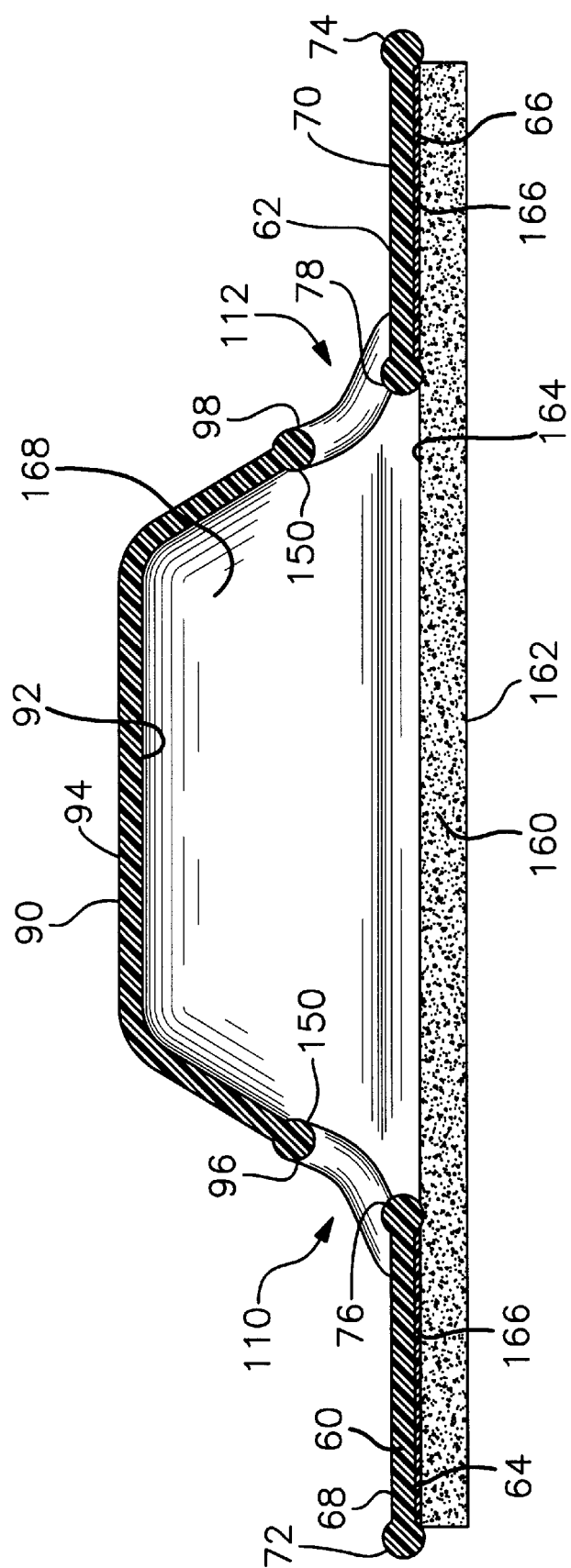
FIG. 10 is a cross-section taken on line 10—10 of FIG. 5.
Figure 11:
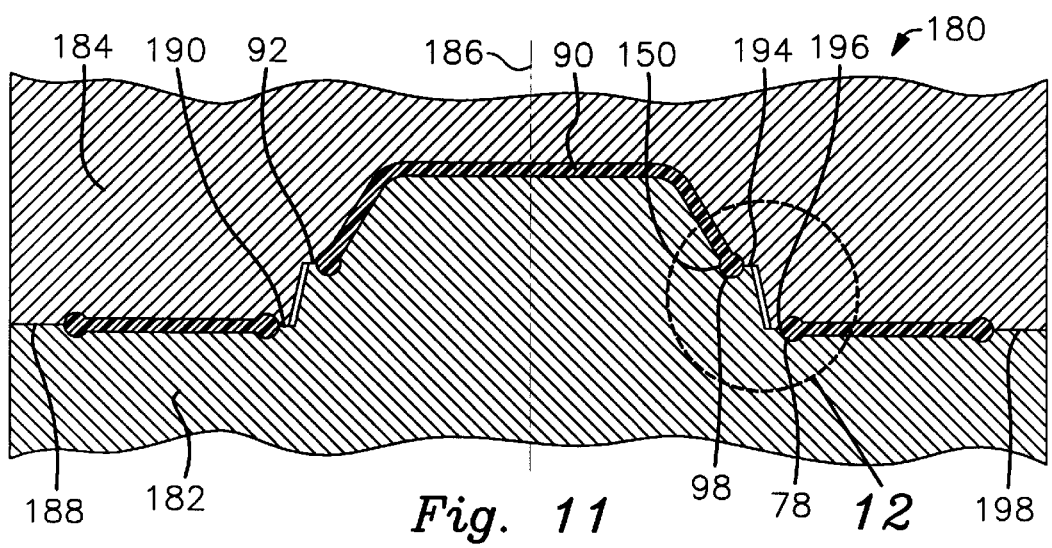
FIG. 11, which is in the same orientation of FIG. 10, depicts in cross-section an injection molding operation during which the body portion of the repositioner is formed.
Figure 12:
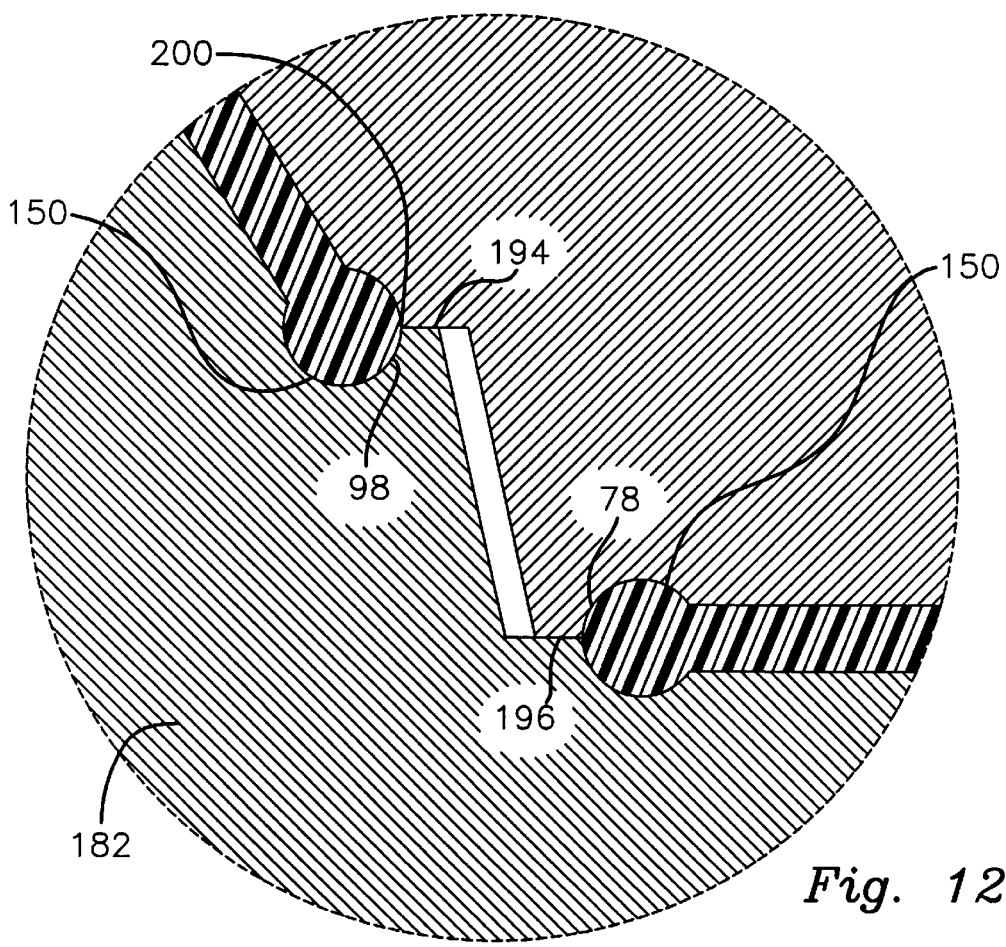
FIG. 12 is an enlarged portion of the FIG. 11 cross-section showing the mold shut off.

With particular reference to FIG. 11, depicted is the same cross-section of the center section 90 and side wings 60 and 62 of FIG. 10, as they are being formed by an injection molding process employing an injection mold 180 comprising a core 182 and a cavity 184 which move relative to each other and in a direction parallel to a mold axis 186 for opening and closing the mold 180. Points of contact between the core 182 and cavity 184 define mold parting lines 188, 190, 192, 194, 196 and 198. Plastic is injected into the mold under extremely high pressure, for example 20,000 psi, and it is important that plastic not leak at the mold parting lines 188, 190, 192, 194, 196 and 198.

Corresponding to the mold parting lines 180, 190, 192, 194, 196 and 198, there is a witness line 200 on the molded part, that is, on the plastic body 50 itself. Ideally, the witness line 200 is not particularly noticeable. However, in the case of a worn or poorly designed mold 180, the witness line 200 may be quite evident as "flash" having a sharp edge.

Thus, the witness line 200 extends along each curved edge of the body 50, the curved edges being represented by the rounded bead 150. The witness line 200 may be defined as a continuum of points where lines tangent to the curved edge and parallel to the mold axis 186 during forming of the body 50 intersect the curved edge.

Also related to manufacturability, the polyolefin elastomer ethylene alpha-olefin copolymer employed has a relatively high melt index of 30. This facilitates injecting plastic through a port (not shown) located in approximately the middle of the center section 90, and plastic material flows up and down and through the joining regions 102, 104, 106 and 108 into the side wings 60 and 62 to completely form the body 50 before the plastic solidifies.

Figure 13:
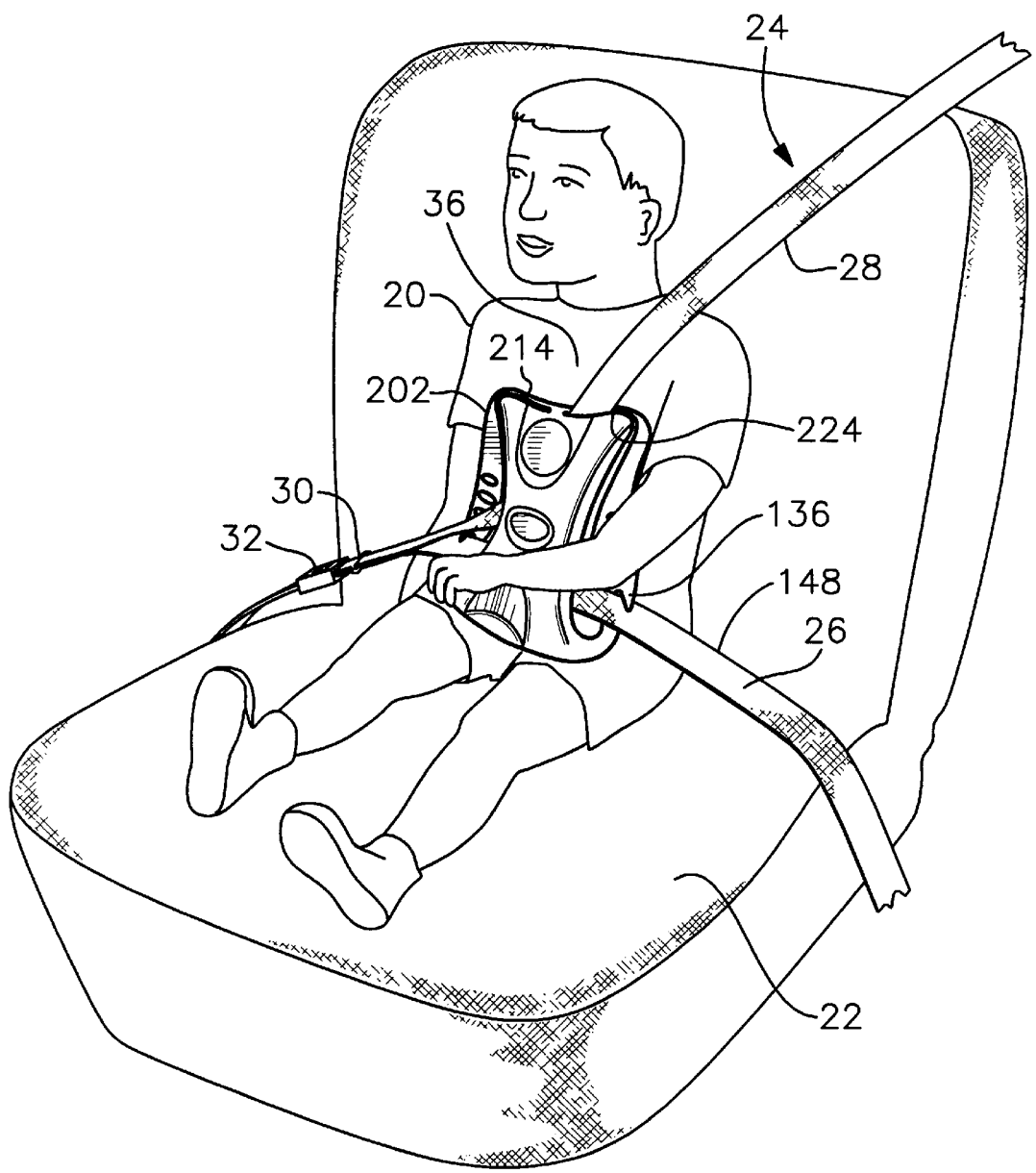
FIG. 13 depicts a modified shoulder strap repositioner embodying the invention in use.
Figure 14:
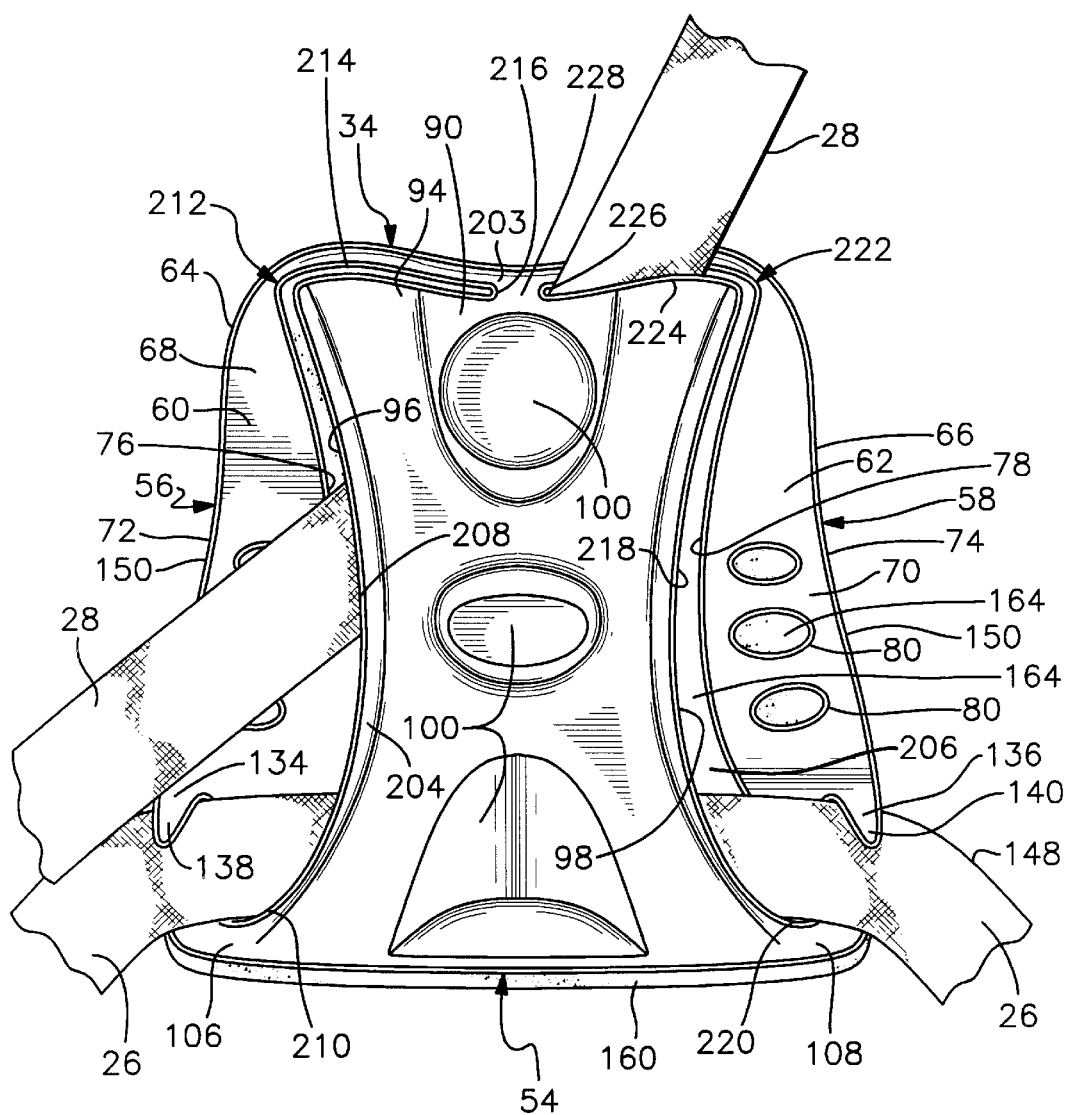
FIG. 14 is an enlarged front elevational view of the repositioner of FIG. 13, depicting the manner of engagement with the lap belt and shoulder strap.
Figure 15:
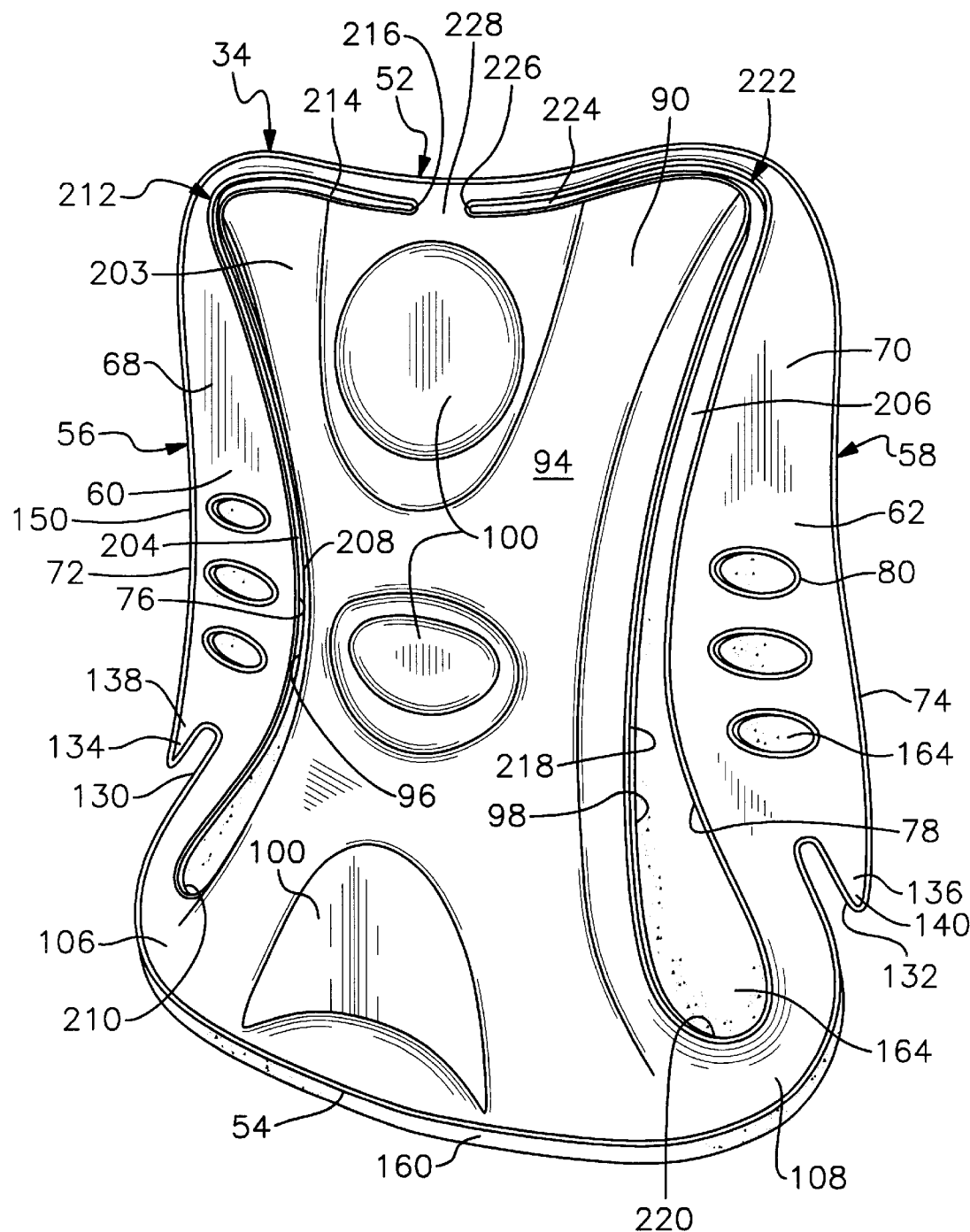
FIG. 15 is a three dimensional view of the repositioner of FIG. 13.

Referring next to FIGS. 13, 14 and 15, a modified shoulder strap repositioner 202 embodying the invention is depicted in use in FIG. 13, and in enlarged detail in FIGS. 14 and 15. FIG. 13 differs from FIG. 1 in that, in FIG. 13 the shoulder strap 28 crosses more nearly over the sternum of the child 20 (or adult of short stature) and over the clavicle midway between the sterno-clavicular joint and the shoulder joint (greater tubercle of humerus), while still avoiding the face 38 and neck. This configuration allows the seat belt assembly 24 to serve its design function in the event of a crash, with minimal interference from the repositioner 202. In the event of a crash, twisting of the torso and spine should be minimized. At the same time the repositioner 202 serves the function of making the seat belt assembly 24 more comfortable to wear, thus encouraging use of the seat belt assembly 24.

Referring in addition to FIGS. 14 and 15, the repositioner 202 is essentially identical to the repositioner 34 of FIGS. 1–10, with the exception of the specific configuration of the generally vertically-extending slots. In particular, as a modification to the slots 110 and 112, the repositioner 202 comprises a plastic body 203 having generally vertically-extending left and right side slots 204 and 206 which are inverted "L"-shaped in configuration. Thus left side slot 204 has a generally vertically-extending segment 208 adjacent a relatively lower termination 210 of the slot 204, joining at 212 a generally horizontally-extending segment 214 which is adjacent a relatively upper termination 216 of the slot 204. Likewise, the right side slot 206 has a generally vertically-extending segment 218 adjacent a relatively lower termination 220 of the slot 206, joining at 222 a generally horizontally-extending segment 224 which is adjacent a relatively upper termination 226 of the slot 206. The relatively upper terminations 216 and 226 face each other, and the repositioner 202 is laterally symmetrical.

In other respects, the repositioner 202 of FIGS. 13–15 is like the repositioner 34 of FIGS. 1–10, and identical reference numerals are used to designate corresponding elements (which are not all described in detail with reference to FIGS. 13–15). The repositioner 202 is made of the same material as the repositioner 34.

The horizontally-extending segments 214 and 224 accommodate a shoulder strap 28 position more towards the center of the child 20, as depicted in FIG. 13, compared to the configuration of FIG. 1. In other words, there is less deflection of the shoulder strap 28. In addition, the repositioner 202 of FIGS. 13–15 is more flexible than the repositioner 34 of FIGS. 1–10, even when the body 203 made of the same material as the body 50 and is of the same thickness, because there is less bridging material between the relatively upper terminations 216 and 226, at region 228. Region 228 is also where the left and right side wings 60 and 62 are actually joined to the center section 90.

The slots 204 and 206 are configured such that, during use, the lap belt 26 and shoulder strap 28 pass through the slots 204 and 206, with the lap belt 26 and shoulder strap 28 crossing over portions of the front surfaces 68 and 70 of the side wings 60 and 62, and crossing over portions of the rear surface 92 of the center section 90, that is, behind the center section 90. In the repositioner 202 embodiment, the lap belt 26 and shoulder strap 28 actually contact the crossed-over portions of the front surfaces 68 and 70, but are spaced from most of the crossed-over portions of the rear surface 92 of the center section 90, since the center section 90 is convex when viewed from the front. The lap belt 26 is positioned adjacent the relatively lower terminations 210 and 220 of the slots 204 and 206, and the shoulder strap 28 contacts the relatively upper termination 216 or 226 of one of the slots 204 or 206.

In the particular manner of use depicted in FIGS. 13 and 14, the shoulder strap 28, when viewed from the front, diagonally extends generally from the upper right to the lower left. During initial fitting of the repositioner 202, the buckle device element 30, with lap belt 26 and shoulder strap 28 attached, is passed first through the right side slot 112, behind the center section 90, and then through the left side slot 204. The shoulder strap 28 accordingly contacts the relatively upper termination 226 of right side slot 206. With the body 50 held in position by the lap belt 26, this engagement with the relatively upper termination 226 of the slot 206 serves to deflect or redirect the shoulder strap 28 away from the face 38 and neck 40 of the seated child 20, to a position over the clavicle midway between the sternoclavicular joint and the shoulder joint, and also causing the shoulder strap 28 to cross more nearly over the sternum.

In addition, the geometry is such that the repositioner 202 cannot be disengaged from the lap belt 26 and shoulder strap 28 when the seat belt assembly 24 in use, as an additional safety feature.

The lateral symmetry of the repositioner 202 allows the repositioner 202 to be used with seat belt assemblies 24 on either the left or right side of the vehicle, with the front surface 94 of the center section 90 and its ornamental features 100 always visible. In addition, the rear side of the repositioner 202 is configured for comfort against the torso 36 of the user, and so is in the same orientation with reference to the torso 36 regardless of the vehicle side. Thus, FIGS. 13 and 14 may in effect be reversed in the manner of a mirror image such that the shoulder strap 28 would diagonally extend generally from the upper left to lower right. Correspondingly, during initial fitting of the repositioner 34, the buckle device element 30, with lap belt 26 and shoulder strap 28 attached, would be passed first through the left side slot 204, behind the center section 90, and then through the right side slot 206. The shoulder strap 28 would contact the relatively upper termination 216 of the left side slot 204, and thereby be deflected.

In the repositioner 202 embodiment, the slots 204 and 206 are wider near the relatively lower terminations 210 and 220 compared to near the relatively upper terminations 216 and 226, which facilitates passage of the buckle element 30 with the lap belt 26 and shoulder strap 28 attached through the slots 204 and 206, in combination with the flexibility of the material itself. Ideally, the fit is such that, when the buckle device 32 is unbuckled, and the seat belt assembly 24 is not in use, the buckle element 32 does not pass back through the slots 204 and 206, and the repositioner 202 remains attached to the lap belt 26.

Referring next to FIGS. 16–20, an alternative shoulder strap repositioner 250 embodying the invention comprises a body 252, which may but not necessarily take the form of a flat sheet of plastic material, having a front surface 254 (FIGS. 16–18 and 20) and an opposed rear surface 256. The repositioner 250 is positionable against the torso of a seated person in the same manner as is depicted in FIG. 1, and is for use in combination with the vehicle seat belt assembly 24, including the lap belt 26 and diagonally-extending shoulder strap 28 attached to buckle device element 30. The particular repositioner 250 is laterally symmetrical about a vertical center plane, and accordingly can be used with seat belt assemblies 24 on either the left or right side of the vehicle with the rear surface 256 always facing the torso of the user and the front surface 254 available for decorative indicia (not shown) without interfering with comfort.

The body 252 has a pair of laterally spaced generally vertically-extending slots 258 and 260 having respective upper ends 262 and 264 and respective lower ends 266 and 268. The slots 258 and 260 have closed peripheries, and the geometry is such that the repositioner 250 cannot be disengaged from the lap belt 26 and shoulder strap 28 when the seat belt assembly 24 is in use.

Thus the configuration is such that during use the lap belt 26 and shoulder strap 28 pass through the slots 258 and 260, with the lap belt 26 and shoulder strap 28 crossing over portions of one of the opposed surfaces 254 and 256 in an intermediate region 270 and crossing over portions of the other one of the opposed surfaces 254 and 256 in outer regions 272 and 274 outside of the slots 258 and 260. It will be appreciated that the intermediate region 270 corresponds to the center section 90 of the body 50 of the repositioner 34 embodiment of FIGS. 1–10, and that the outer regions 272 and 274 correspond to the wings 60 and 62 of the body 50 of the repositioner 34 embodiment. During use the lap belt 26 is positioned adjacent the lower ends 266 and 268 of the slots 258 and 260, and the shoulder strap 28 contacts the upper end 262 or 264 of one of the slots 258 or 260. With the repositioner 250 held in position by the lap belt 26, this engagement with the upper end 262 or 264 of the slot 258 or 260 serves to deflect or redirect the shoulder strap 28 away from the face and neck of a seated child in the same manner as is described hereinabove with reference to FIG. 1.

In the particular manner of use represented in FIG. 17, the lap belt 26 and shoulder strap 28 cross over portions of the front surface 254 in the intermediate region 270, and cross over portions of the rear surface 256 in the outer regions 272 and 274. During initial fitting of the repositioner 250, the buckle device element 30, with lap belt 26 and shoulder strap 28 attached, is passed first through the slot 260 and then through the slot 258. The shoulder strap 28 contacts the upper end 264 of the slot 260, and is thereby deflected.

FIG. 18 depicts an alternative manner of use of the same repositioner 250. It will be appreciated that the manner in which the lap belt 26 and shoulder strap 28 pass through the slots 258 and 260 in FIG. 18 corresponds to the manner in which the lap belt 26 and shoulder strap 28 pass through the slots 110 and 112 of the repositioner 34 of FIGS. 1–10. Thus in FIG. 18 the lap belt 26 and shoulder strap 28 cross over portions of the rear surface 256 in the intermediate region 270, that is, "behind" the intermediate region 270, and cross over portions of the front surface 254 in the outer regions 272 and 274. As in FIG. 17, during the initial fitting of the repositioner 250 in FIG. 18, the buckle device element 30, with lap belt 26 and shoulder strap 28 attached, is passed first through the slot 260 and then through the slot 258. The shoulder strap 28 contacts the upper end 264 of the slot 260, and is thereby deflected.

Figure 19:
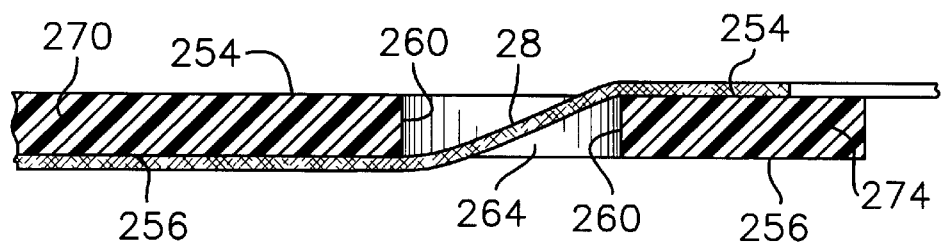
FIG. 19 is a cross-section taken on line 19—19 of FIG. 18.

FIG. 19 is a cross-sectional view in the vicinity of the upper end 264 of the slot 260, with the shoulder strap 28 passing through. From FIG. 19 it will be seen that the particular repositioner 250 embodiment is generally planar, but that is not a requirement. As an example, the repositioner 34 embodiment of FIGS. 1–10 is not planar.

FIG. 20 is in effect a mirror image of FIG. 18, and illustrates the manner in which the lateral symmetry of the repositioner 250 allows the repositioner 250 to be used with seat belt assemblies 24 on either the left or the right side of the vehicle with the rear surface 256 always facing the torso of the user and the front surface 254 available for decorative indicia (not shown) without interfering with comfort. FIG. 20 differs from FIG. 18 in that the shoulder strap 28 crosses diagonally in the opposite direction; during the initial fitting of the repositioner 250 the buckle device element 30, with lap belt and shoulder strap 28 attached, is passed first through the slot 258 and then through the slot 260; and the shoulder strap 28 is deflected by contact with the upper end 262 of the slot 258.

Referring finally to FIGS. 21–25, another alternative shoulder strap repositioner 350 embodying the invention comprises a body 252, which may but not necessarily take the form of a flat sheet of plastic material, having opposed surfaces 354 and 356. Unlike the repositioner 34 embodiment of FIGS. 1–10, the repositioner 202 embodiment of FIGS. 13–15, and the repositioner 250 embodiment of FIGS. 16–20, the repositioner 350 of FIGS. 21–25 is not laterally symmetrical. Thus the body 352 of the repositioner 350 of FIGS. 21–25 is trapezoidal in configuration. While the repositioner 350 can be used in combination with seat belt assemblies 24 on either the left or right side of the vehicle, reversing the orientation of the repositioner 350 is required such that either one of the opposed surfaces 354 and 356 or the other faces the torso of the user.

The body 352 is positionable against the torso of a seated person in the same manner as is depicted in FIG. 1, and is for use in combination with the vehicle seat belt assembly 24, including the lap belt 26 and diagonally-extending shoulder strap 28 attached to buckle device element 30.

The body 352 has a pair of laterally spaced generally vertically-extending slots 358 and 360 having respective upper ends 362 and 364 and respective lower ends 366 and 368. Consistent with the trapezoidal configuration of the body 352, the slot 358 is greater in vertical extent that the slot 360.

As in the embodiments described hereinabove, slots 358 and 360 have closed peripheries, and the geometry is such that the repositioner 350 cannot be disengaged from the lap belt 26 and shoulder strap 28 when the seat belt assembly 24 is in use.

Thus the configuration is such that during use the lap belt 26 and shoulder strap 28 pass through the slots 358 and 360, with the lap belt 26 and shoulder strap 28 crossing over portions of one of the opposed surfaces 354 and 356 in an intermediate region 370 and crossing over portions of the other one of the opposed surfaces 354 and 356 in outer regions 372 and 374 outside of the slots 358 and 360. Since the repositioner 350 is not laterally symmetrical, during initial fitting the buckle device element 30, with lap belt and shoulder strap 28 attached, in all cases is passed first through the slot 358 greater in vertical extent, and then through the slot 360. During use the lap belt 26 is positioned adjacent the lower ends 366 and 368 of the slots 358 and 360, and the shoulder strap 28 contacts the upper end 362 of the slots 358. With the repositioner 250 held in position by the lap belt 26, this engagement with the upper end 362 of the slot 358 serves to deflect or redirect the shoulder strap 28 away from the face and neck of a seated child in the same manner as is described hereinabove with reference to FIG. 1.

In the particular manner of use represented in FIG. 22, the lap belt 26 and shoulder strap 28 cross over portions of the surface 354 in the intermediate region 370, that is, "in front of" the intermediate region 370, and cross over portions of rear surface 356 in the outer regions 372 and 374. In the FIG. 22 configuration, the surface 356 faces the torso of the user and accordingly is not visible. The surface 354 is generally visible. The shoulder strap 28 contacts the upper end 364 of the slot 358, and is thereby deflected.

FIG. 23 depicts an alternative manner of use of the same repositioner 350 in the same orientation of FIG. 22. Thus in FIG. 23 the lap belt 26 and shoulder strap 28 cross over portions of the rear surface 256 in the intermediate region 270, that is, "behind" the intermediate region 370, and cross over portions of the surface 354 in the outer regions 372 and 374. The shoulder strap 28 again contacts the upper end 362 of the slot 358, and is thereby deflected.

FIG. 24 is in effect a mirror image of FIG. 23, and illustrates the manner in which the repositioner 350 is reversible for use in combination with seat belt assemblies 24 on either the left or the right side of the vehicle. In FIG. 24, the surface 354 faces the torso of the user, and the surface 356 is generally visible. FIG. 24 differs from FIG. 23 in that the shoulder strap 28 cross diagonally in the opposite direction.

Figure 25:
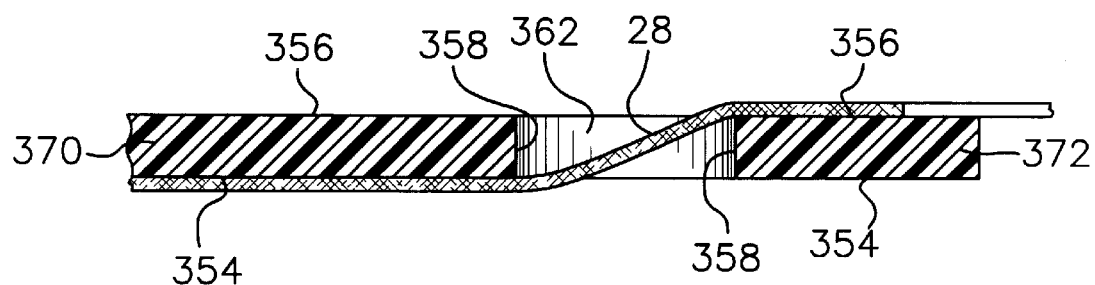
FIG. 25 is a cross-section taken on line 25—25 of FIG. 24.

FIG. 25 is a cross-sectional view in the vicinity of the upper end 362 of the slot 358, with the shoulder strap 28 passing through. From FIG. 25 it will be seen that the particular repositioner 350 embodiment is generally planar, but that is not a requirement.

While specific embodiments of the invention have been illustrated and described herein, it is realized that numerous modifications and changes will occur to those skilled in the art. It is therefore to be understood that the appended claims are intended to cover all such modifications and changes that fall within the true spirit and scope of the invention.

What is claimed is:

1. A combination comprising:

a vehicle seat belt assembly including a lap belt and a diagonally-extending shoulder strap attached to one element of a buckle device; and a shoulder strap repositioner including a body having a top, bottom, left side and right side and positionable against a torso of a seated person, said body in turn including:

left and right side wings each having a rear surface that faces the torso during use and an opposed front surface, said left and right side wings having respective generally vertically-extending outer edges defining the left and right sides of said body, and having respective generally vertically-extending inner edges facing towards each other;

a center section having a rear surface, an opposed front surface, and generally vertically-extending left and right side edges;

each of said side wings being joined to said center section at the top and bottom, the inner edges of said side wings and the side edges of said center section cooperating to define generally vertically-extending left and right side slots having respective relatively upper and relatively lower terminations and having closed peripheries; and said slots being configured such that said lap belt and shoulder strap pass through said slots, with said lap belt and shoulder strap crossing over portions of said front surfaces of said side wings and crossing over portions of said rear surface of said center section, with said lap belt positioned adjacent the relatively lower terminations of said slots, and with said shoulder strap contacting the relatively upper termination of one of said slots.

2. The combination of claim 1, wherein said repositioner is laterally symmetrical about a vertical center plane.

3. The combination of claim 1, wherein said left and right side wings and said center section are integral.

4. The combination of claim 3, wherein said body comprises a molded plastic material.

5. The combination of claim 4, wherein the material is flexible and wherein the configuration of said slots and the flexibility of the material are such that said one element of said buckle device with said lap belt and shoulder strap attached can pass through said slots.

6. A shoulder strap repositioner of for use in combination with a vehicle seat belt assembly having a lap belt and a diagonally-extending shoulder strap attached to one element of a buckle device, said repositioner comprising a body having a top, bottom, left side and right side and positionable against a torso of a seated person, said body including:

left and right side wings each having a rear surface that faces the torso during use and an opposed front surface, said left and right side wings having respective generally vertically-extending outer edges defining the left and right sides of said body, and having respective generally vertically-extending inner edges facing towards each other;

a center section having a rear surface, an opposed front surface, and generally vertically-extending left and right side edges;

each of said side wings being joined to said center section at the top and bottom, the inner edges of said side wings and the side edges of said center section cooperating to define generally vertically-extending left and right side slots having respective relatively upper and relatively lower terminations and having closed peripheries;

said generally vertically-extending left and right side slots being inverted "L"-shaped in configuration, each comprising a generally vertically-extending segment adjacent the respective relatively lower termination joining a generally horizontally-extending segment adjacent the respective relatively upper termination; and said slots being configured such that during use the lap belt and shoulder strap pass through said slots, with the lap belt and shoulder strap crossing over portions of said front surfaces of said side wings and crossing over portions of said rear surface of said center section, with the lap belt positioned adjacent the relatively lower terminations of said slots, and with the shoulder strap contacting the relatively upper termination of one of said slots.

7. The respositioner of claim 6, wherein said generally vertically-extending segments of said slots are relatively wider near the relatively lower terminations.

8. A shoulder strap repositioner for use in combination with a vehicle seat belt assembly having a lap belt and a diagonally-extending shoulder strap attached to one element of a buckle device, said repositioner comprising a body having a top, bottom, left side and right side and positionable against a torso of a seated person, said body including:

left and right side wings each having a rear surface that faces the torso during use and an opposed front surface, said left and right side wings having respective generally vertically-extending outer edges defining the left and right sides of said body, and having respective generally vertically-extending inner edges facing towards each other;

a center section having a rear surface, an opposed front surface, and generally vertically-extending left and right side edges, said center section being convex in configuration when viewed from the fronts;

each of said side wings being coined to said center section at the top and bottom, the inner edges of said side wings and the side edges of said center section cooperating to define generally vertically-extending left and right side slots having respective relatively upper and relatively lower terminations and having closed peripheries; and said slots being configured such that during use the lap belt and shoulder strap pass through said slots, with the lap belt and shoulder strap crossing over portions of said front surfaces of said side wings and crossing over portions of said rear surface of said center section, with the lap belt positioned adjacent the relatively lower terminations of said slots, and with the shoulder strap contacting the relatively upper termination of one of said slots.

9. A shoulder strap repositioner for use in combination with a vehicle seat belt assembly having a lap belt and a diagonally-extending shoulder strap attached to one element of a buckle device, said repositioner comprising a body having a top, bottom, left side and right side and positionable against a torso of a seated person, said body including:

left and right side wings each having a rear surface that faces the torso during use and an opposed front surface, said left and right side wings having respective generally vertically-extending outer edges defining the left and right sides of said body, and having respective generally vertically-extending inner edges facing towards each other;

a center section having a rear surface, an opposed front surface, and generally vertically-extending left and right side edges;

each of said side wings being Joined to said center section at the top and bottom, the inner edges of said side wings and the side edges of said center section cooperating to define generally vertically-extending left and right side slots having respective relatively upper and relatively lower terminations and having closed peripheries;

said slots being configured such that during use the lap belt and shoulder strap pass through said slots, with the lap belt and shoulder strap crossing over portions of said front surfaces of said side wings and crossing over portions of said rear surface of said center section, with the lap belt positioned adjacent the relatively lower terminations of said slots, and with the shoulder strap contacting the relatively upper termination of one of said slots; and said side wings being configured such that said portions of said front surfaces of said side wings are contacted by the lap belt and shoulder strap during use.

10. A shoulder strap repositioner for use in combination with a vehicle seat belt assembly having a lap belt and a diagonally-extending shoulder strap attached to one element of a buckle device, said repositioner comprising a body having a top, bottom, left side and right side and positionable against a torso of a seated person, said body including:

left and right side wings each having a rear surface that faces the torso during use and an opposed front surface, said left and right side wings having respective generally vertically-extending outer edges defining the left and right sides of said body, and having respective generally vertically-extending inner edges facing towards each other;

a center section having a rear surface, an opposed front surface, and generally vertically-extending left and right side edges;

each of said side wings being joined to said center section at the top and bottom, the inner edges of said side wings and the side edges of said center section cooperating to define generally vertically-extending left and right side slots having respective relatively upper and relatively lower terminations and having closed peripheries;

said slots being configured such that during use the lap belt and shoulder strap pass through said slots, with the lap belt and shoulder strap crossing over portions of said front surfaces of said side wings and crossing over portions of said rear surface of said center section, with the lap belt positioned adjacent the relatively lower terminations of said slots, and with the shoulder strap contacting the relatively upper termination of one of said slots; and said side wings having notches formed in the outer edges configured to engage an upper edge of the lap belt so as to limit downward movement of said body relative to the lap belt.

11. The repositioner of claim 10, wherein tabs are defined between each of said notches and an adjacent portion of the corresponding outer edge, said tabs being sufficiently flexible such that said tabs can deflect for engagement of said notches and the lap belt.

12. The repositioner of claim 11, wherein, when said notches have engaged an upper edge of the lap belt, portions of the lap belt cross over rear surfaces of said tabs.

13. A shoulder strap repositioner for use in combination with a vehicle seat belt assembly having a lap belt and a diagonally-extending shoulder strap attached to one element of a buckle device, said repositioner comprising:

a body having a top, bottom, left side and right side and positionable against a torso of a seated person, said body including:

left and right side wings each having a rear surface that faces the torso during use and an opposed front surface, said left and right side wings having respective generally vertically-extending outer edges defining the left and right sides of said body, and having respective generally vertically-extending inner edges facing towards each other;

a center section having a rear surface, an opposed front surface, and generally vertically-extending left and right side edges;

each of said side wings being joined to said center section at the top and bottom, the inner edges of said side wings and the side edges of said center section cooperating to define generally vertically-extending left and right side slots having respective relatively upper and relatively lower terminations and having closed peripheries; and said slots being configured such that during use the lap belt and shoulder strap pass through said slots, with the lap belt and shoulder strap crossing over portions of said front surfaces of said side wings and crossing over portions of said rear surface of said center section, with the lap belt positioned adjacent the relatively lower terminations of said slots, and with the shoulder strap contacting the relatively upper termination of one of said slots; and a backing sheet extending across the rear surfaces of said side wings and behind said center section, said backing sheet being adhered to the rear surfaces of said side wings but not to said center section between said side edges such that during use the lap belt and shoulder strap pass between said backing sheet and said center section.

14. The repositioner of claim 13, wherein said backing sheet comprises elastomeric foam.

15. The repositioner of claim 13, wherein the upper ends of said slots, said side edges of said center section, and said backing sheet are configured so as to frictionally grip the shoulder strap.

16. A shoulder strap repositioner for use in combination with a vehicle seat belt assembly having a lap belt and a diagonally-extending shoulder strap attached to one element of a buckle device, said repositioner comprising a body having a top, bottom, left side and right side and positionable against a torso of a seated person, said body including:

left and right side wings each having a rear surface that faces the torso during use and an opposed front surface, said left and right side wings having respective generally vertically-extending outer edges defining the left and right sides of said body, and having respective generally vertically-extending inner edges facing towards each other;

a center section having a rear surface, an opposed front surface, and generally vertically-extending left and right side edges;

each of said side wings being joined to said center section at the top and bottom, the inner edges of said side wings and the side edges of said center section cooperating to define generally vertically-extending left and right side slots having respective relatively upper and relatively lower terminations and having closed peripheries and, exposed edges of said wide wings and of said center section comprising curved edges; and said slots being configured such that during use the lap belt and shoulder strap pass through said slots, with the lap belt and shoulder strap crossing over portions of said front surfaces of said side wings and crossing over portions of said rear surface of said center section, with the lap belt positioned adjacent the relatively lower terminations of said slots, and with the shoulder strap contacting the relatively upper termination of one of said slots; wherein said body has been formed in an injection mold including a core and a cavity which move relative to each other in a direction parallel to a mold axis for opening and closing the mold, points of contact between the core and cavity defining a mold parting line; and wherein a witness line extends along each curved edge of said body, the witness line being defined as a continuum of points where lines tangent to said curved edge and parallel to the mold axis during forming of said body intersect said curved edge, the witness line corresponding to the mold parting line;

whereby the mold parting line can comprise a shut-off surface for enhanced mold performance and durability.

17. The repositioner of claim 16 wherein said curved exposed edges of said side wings and of said center section comprise rounded beads.

18. The repositioner of claim 17, wherein said rounded beads extend beyond said front and rear surfaces of said side wings and of said center section.

19. A shoulder strap repositioner for use in combination with a vehicle seat belt assembly having a lap belt and a diagonally-extending shoulder strap attached to one element of a buckle device, said repositioner comprising a body having a top, bottom, left side and right side and positionable against a torso of a seated person, said body including:

left and right side wings each having a rear surface that faces the torso during use and an opposed front surface, said left and right side wings having respective generally vertically-extending outer edges defining the left and right sides of said body, and having respective generally vertically-extending inner edges facing towards each other;

a center section having a rear surface, an opposed front surface, and generally vertically-extending left and right side edges;

each of said side wings being Joined to said center section at the top and bottom, the inner edges of said side wings and the side edges of said center section cooperating to define generally vertically-extending left and right side slots having respective relatively upper and relatively lower terminations and having closed peripheries, said slots being relatively wider near the relatively lower terminations; and said slots being configured such that during use the lap belt and shoulder strap pass through said slots, with the lap belt and shoulder strap crossing over portions of said front surfaces of said side wings and crossing over portions of said rear surface of said center section, with the lap belt positioned adjacent the relatively lower terminations of said slots, and with the shoulder strap contacting the relatively upper termination of one of said slots.

20. A combination comprising:

a vehicle seat belt assembly including a lap belt and a diagonally-extending shoulder strap; and a shoulder strap repositioner including a body positionable against a torso of a seated person, said body having a pair of opposed surfaces and a pair of laterally spaced generally vertically-extending slots in said body, said slots having respective relatively upper and relatively lower terminations and having closed peripheries, and configured such that said lap belt and shoulder strap pass through said slots, with said lap belt and shoulder strap crossing over portions of one of said opposed surfaces between said slots and crossing over portions of the other one of said opposed surfaces outside of said slots, with said lap belt positioned adjacent the relatively lower terminations of said slots, and with said shoulder strap contacting the relatively upper termination of one of said slots.

21. The combination of claim 20, wherein said slots are identical in vertical extent.

22. The combination of claim 20, wherein said shoulder strap repositioner is laterally symmetrical about a vertical center plane.

23. A shoulder strap repositioner for use in combination with a vehicle seat belt assembly having a lap belt and a diagonally-extending shoulder strap, said repositioner comprising:

a body positionable against a torso of a seated person, said body having a pair of opposed surfaces and a pair of laterally spaced generally vertically-extending slots in said body, said slots having respective relatively upper and relatively lower terminations and having closed peripheries, said generally vertically-extending slots being inverted "L"-shaped in configuration, each slot comprising a generally vertically-extending segment adjacent the respective lower termination joining a generally horizontally-extending segment adjacent the respective upper termination, and said slots configured such that during use the lap belt and shoulder strap pass through said slots, with the lap belt and shoulder strap crossing over portions of one of said opposed surfaces between said slots and crossing over portions of the other one of said opposed surfaces outside of said slots, with the lap belt positioned adjacent the relatively lower terminations of said slots, and with the shoulder strap contacting the relatively upper termination of one of said slots.

24. The repositioner of claim 23, which is laterally symmetrical about a vertical center plane.

25. The respositioner of claim 23, wherein said slots are identical in vertical extent.

* * * * *